United States Patent
Broyles, III

(10) Patent No.: US 7,076,643 B2
(45) Date of Patent: Jul. 11, 2006

(54) METHOD AND APPARATUS FOR PROVIDING REVISION IDENTIFICATION NUMBERS

(75) Inventor: Paul J. Broyles, III, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 322 days.

(21) Appl. No.: 10/352,808

(22) Filed: Jan. 28, 2003

(65) Prior Publication Data

US 2004/0148499 A1 Jul. 29, 2004

(51) Int. Cl.
*G06F 11/00* (2006.01)
(52) U.S. Cl. ............... 713/1; 713/2; 713/500; 714/7; 714/11; 710/62
(58) Field of Classification Search ............... 713/1, 713/2, 500; 714/7, 11; 710/62
See application file for complete search history.

(56) References Cited

U.S. PATENT DOCUMENTS

| | | | | |
|---|---|---|---|---|
| 5,388,212 A * | 2/1995 | Grube et al. | ............... | 713/200 |
| 5,978,913 A | 11/1999 | Broyles et al. | | |
| 6,311,246 B1 * | 10/2001 | Wegner et al. | ............... | 710/305 |
| 6,405,311 B1 | 6/2002 | Broyles et al. | | |
| 6,654,714 B1 * | 11/2003 | Gentile et al. | ............... | 703/22 |
| 2003/0126421 A1 * | 7/2003 | Nalawadi et al. | ............... | 713/1 |
| 2004/0003224 A1 * | 1/2004 | Rabe et al. | ............... | 713/1 |

* cited by examiner

*Primary Examiner*—A. Elamin

(57) ABSTRACT

Systems and methods are disclosed for detecting and reporting revision identification numbers ("rev IDs"). When the revision identifier of hardware that the computer is built out of changes, this can impact the actual and/or perceived stability of the computer. In some embodiments, devices may include a programmable register, which may be programmed to a revision identifier. This number may be the revision identifier of a previous version of this hardware that was originally incorporated in the system design.

22 Claims, 4 Drawing Sheets

METHOD AND APPARATUS FOR PROVIDING REVISION IDENTIFICATION NUMBERS

BACKGROUND

Consumers Value Stability

In today's computer marketplace there are a myriad of options available to the consumer. Computer configurations that contain a wide array of hardware and software options are often available from a single computer manufacturer such that a single computer manufacturer may offer custom solutions to suit different needs. Some consumers desire to have the latest processor and/or operating system as soon as each are commercially available. These consumers generally tolerate the difficulties encountered by having the latest hardware and software—i.e., overall system instability. System instability results because software developers generally do not know the particular hardware platform that their application will be run on, and therefore write generic multi-platform software applications. This dilemma is exacerbated by the proliferation of successive generations of hardware that contain new features which were not originally considered by software developers. Consumers who are willing to deal with this instability to obtain the latest technology are often smaller entities who are purchasing the computer for home/personal use.

Other consumers are willing to forego the latest changes in hardware and software technology in favor of stable system operation. These consumers generally do not tolerate instability and are willing to pay a premium for a higher degree of stability. For example, a business with its operations dependent on stable computer system operation may not be as concerned with having the fastest processor, but rather more concerned with long term stable computer operation. Many computer manufacturers recognize this business niche and strive to provide stable system operation at a premium.

Revision Identification

In the context of computer systems, hardware is a general term that may be used to describe the non-software portions of a computer system such as integrated circuits, expansion cards, storage devices, etc. New versions of hardware are released for various reasons such as fixing bugs, adding new features, making changes to manufacturing processes, etc. Generally, each new release of hardware will contain a revision identifier ("rev ID"), so as to note and track the changes made between successive generations of hardware. For example, a chip controlling the PCI bridge may undergo a change in manufacturing in order to increase product yield while the functionality of the chip remains unchanged. In this example, the new chip containing the manufacturing changes would receive a new rev ID. This rev ID may be hardware-encoded into the chip. The computer system may comprise many chips, each having their own rev ID.

System Instability

Whenever a computer system is powered on or reset, a storage device (e.g., ROM, NVRAM, etc.) that includes preliminary startup instructions is used to get the computer system up and running. These instructions are generally called the "BIOS," originally because it was used to initialize the basic input/output systems of the computer.

While actual BIOS routines may vary between manufacturers, most have a similar sequence of basic routines that may be rearranged through custom settings. On power up, the BIOS typically checks information stored in a complementary metal oxide semiconductor ("CMOS") memory chip for custom system settings. The BIOS detects hardware devices located in the system (e.g., chips, floppy drive, peripheral cards, etc.), where detecting hardware often includes checking the rev ID of the chips associated with the computer system. Upon detecting the various hardware devices, the BIOS loads interrupt handlers and device drivers. Also, registers and power management systems are initialized. A Power-On-Self-Test ("POST") is typically performed which may verify that the identified hardware devices are working properly. The bootable devices are determined and the operating system is launched or "booted up."

Once the operating system is up and running, it determines whether the rev ID numbers have changed from the last time the computer system was booted up. A change in the rev ID from the last boot up could indicate that a different version of the previous device is present or it could possibly indicate a new hardware device altogether. In any case, the operating system may detect a different rev ID number than expected and indicate to the computer user that new hardware exists.

A device that undergoes a change in rev ID number without a change in functionality (e.g., manufacturing changes, bug fixes, etc.), undergoes what is called a "transparent step." If the rev ID change is a transparent step and no functionality change has taken place, then the new hardware should not need a new device driver and the operating system may load the same device driver as it did for the previous version. The net result is that transparent steps that are detected by the operating system may be reported to the user regardless of the fact that the same device driver is used. This can be problematic for consumers because it may give the impression that the system is unstable when it is not.

BRIEF SUMMARY

The preferred embodiments of the present invention involve additional registers in the address space of peripheral hardware devices. Although the devices may contain a hard coded revision identifier ("rev ID"), the rev ID registers are optionally writable under certain circumstances preferably by using the system BIOS. Consequently, the operating system receives a desired revision identifier that promotes hardware stability. This may be the value currently associated with the peripheral device or another value loaded from a system ROM. In some embodiments, the BIOS controls the CPU to write the requisite rev ID from the system ROM.

According to some embodiments, a computer system includes a processor, a system ROM, and hardware peripheral devices. The hardware peripheral devices have an address space that includes a hard coded register that preferably is hardwired to a predetermined rev ID number, and may include a programmable register that may be programmed to a desired rev ID number. Also, the programmable register may be programmed using a value stored in the system ROM or any other location. In other embodiments, the hardware device may include a selector that may provide the contents of the hard coded register or the contents of the programmable register, where the selector is preferably controlled by the CPU that may in turn be controlled by the BIOS.

According to still other embodiments, a method for improving hardware stability may include recognizing a peripheral device attached to a computer system. The peripheral hardware device may comprise a hard coded register and programmable register. A rev ID in the hard coded register may be compared to a value in a system ROM. If no match is indicated then the programmable register is write-enabled and a desired rev ID value may be written to the programmable register of the hardware device. Also, an external select line of the peripheral hardware device may be enabled to select between the hard coded and programmable registers. In this manner, the contents of either register may be provided to the computer system. The programmable register may then be write-protected so that its value may not be overwritten. This process may be performed on each desired peripheral device present. Accordingly, when the system boots up, the operating system reads a stable rev ID that corresponds to a known driver. Thus, transparent stepping is invisible to the operating system. If the comparison step performed on the next successive peripheral does not indicate that the rev ID matches, then this procedure may be repeated. In some embodiments, the external select line may be controlled by the CPU (as configured by the BIOS) and the desired rev ID may come from a system ROM. Note that some of the embodiments of the present invention are compliant with any peripheral component interconnect specification ("PCI") in that the register containing the rev ID appears write-protected.

BRIEF DESCRIPTION OF THE DRAWINGS

For a detailed description of the embodiments, reference will now be made to the accompanying drawings in which.

NOTATION AND NOMENCLATURE

Certain terms are used throughout the following description and claims to refer to particular system components. As one skilled in the art will appreciate, computer companies and others may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Computer System Overview

Figure 1:
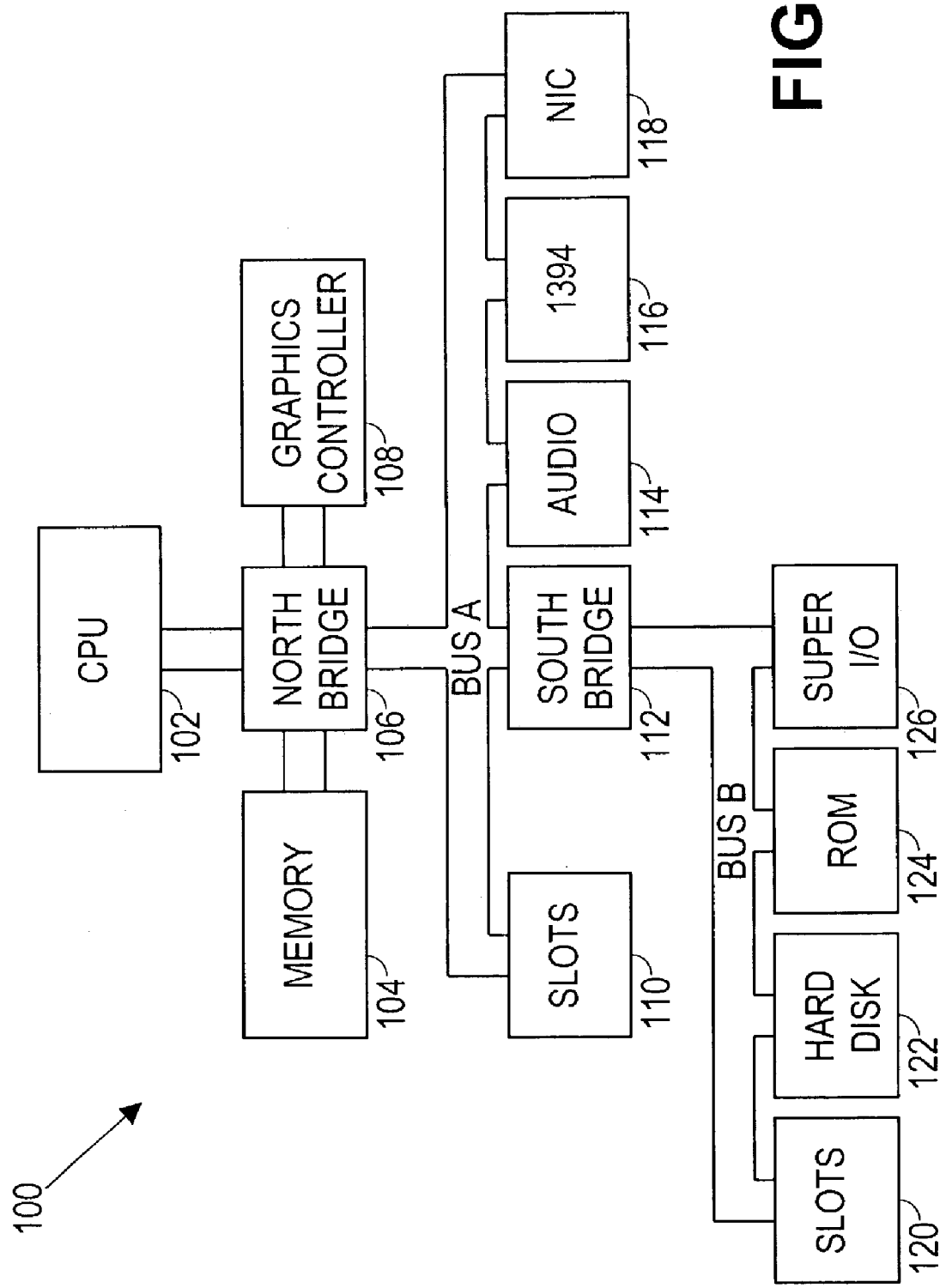
FIG. 1 shows an exemplary implementation of a computer system according to embodiments of the present invention.

FIG. 1 illustrates an exemplary computer system 100 in accordance with embodiments of the present invention. The computer system of FIG. 1 includes a CPU 102 that may be coupled to a bridge logic device 106 via a CPU bus. The bridge logic device 106 is sometimes referred to as a "North bridge." The North bridge 106 typically also couples to a main memory array 104 by a memory bus, and may further couple to a graphics controller 108 via an advanced graphics processor ("AGP") bus. The North bridge 106 typically couples CPU 102, memory 104, and graphics controller 108 to the other peripheral devices in the system through, for example, a primary expansion bus ("BUS A") such as a PCI bus or an EISA bus. Various components that operate using the bus protocol of BUS A may reside on this bus, such as an audio device 114, a IEEE 1394 interface device 116, and a network interface card ("NIC") 118. These components may be integrated onto the motherboard, as suggested by FIG. 1, or they may be plugged into expansion slots 110 that are connected to BUS A. As technology evolves and higher-performance systems are increasingly sought, there is a greater tendency to integrate many of the devices into the motherboard which were previously separate plug-in components.

If other secondary expansion buses are provided in the computer system, as is typically the case, another bridge logic device 112 may be used to couple the primary expansion bus ("BUS A") to the secondary expansion bus ("BUS B"). This bridge logic 112 is sometimes referred to as a "South bridge." An example of such bridge logic is described in U.S. Pat. No. 5,634,073, assigned to the assignee of the present invention. Various components that operate using the bus protocol of BUS B may reside on this bus, such as a hard disk controller 122, a system ROM 124, and Super I/O controller 126. Slots 120 may also be provided for plug-in components that comply with the protocol of BUS B.

The system ROM 124 may be coupled to BUS B and thereby be coupled to every device in the system 100. System ROM 124 preferably is an electrically programmable Read-Only-Memory. As the name suggests, in order to alter the contents of a ROM, it must be "flashed" or electrically programmed, which entails applying the proper voltages and currents to it. This flashing may be accomplished by actually physically removing the ROM, setting jumpers or by other means. In addition, flashing may be accomplished using software techniques. System ROM 124 comprises firmware programs executable by the CPU 102. The firmware programs preferably include programs to implement basic input/output system ("BIOS") commands, and instructions executed during and after Power-On-Self-Test ("POST") procedures. Preferably, the CPU controls the peripheral devices under the direction of the BIOS.

Revision Identification

In some embodiments, hardware registers within a device may contain predetermined revision identifiers ("rev IDs"). Revision identification may be used to mark hardware changes in successive generations of hardware, where the rev ID of peripherals attached to the computer system may be stored in its hardware registers during the manufacture of the computer system. This rev ID value may reflect the original version of the peripheral device used in the system. For example, NIC 118 may contain hardware registers that include BIOS and POST routines for the peripheral, and also may contain a hard coded rev ID. This rev ID reflects the current version of the peripheral hardware, which may be a different version from that originally used in the system and reflected by the predetermined rev ID in the hardware registers.

After the operating system takes control of the computer system, the system ROM 124 is checked in order to determine if the stored rev ID numbers match the rev ID numbers provided by the peripheral hardware devices (which may be contained in their respective hardware registers). If they do not match, this indicates that the rev ID of the hardware device may have changed from the predetermined value in system ROM 124, which reflects the original system architecture. A change in rev ID may indicate that new hardware exists which was not part of the original system architecture, or alternately it may indicate that a new version of old hardware is present. A rev ID that marks a new version of hardware with no changes in functionality (e.g., bug fixes, manufacturing changes, etc.) is termed a "transparent step." Operating systems that track transparent steps may create problems, because the operating system may give the impression that the system is unstable when it is not. Of course, the rev ID number may be stored in a location other than the system ROM 124 in some embodiments.

Figure 2:
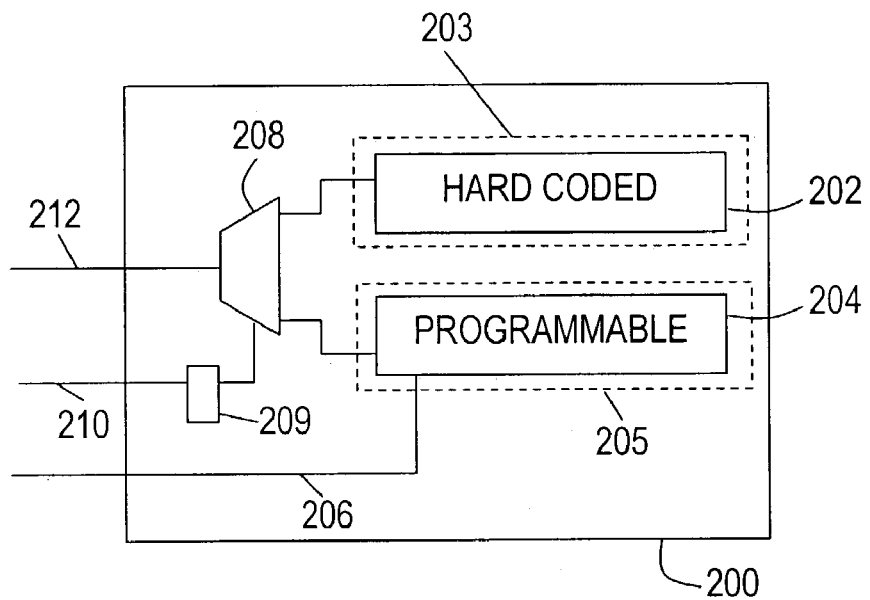
FIG. 2 shows a peripheral according to embodiments of the invention.

In accordance with the embodiments of the present invention, FIG. 2 shows an exemplary peripheral device 200—e.g., NIC 118. Peripheral device 200 comprises register 202 that may be "hard coded" or fused to a predetermined value of the rev ID. Register 202 may be located in a peripheral memory 203. Note that the rev ID value in register 202 may correspond to the current version of the hardware device, which may or may not match the value in system ROM 124. Peripheral device 200 may also comprise register 204 that contains a programmable value of the rev ID. Register 204 may also be located in a peripheral memory 205 that may or may not be associated with memory 203. The programmed value of the rev ID contained in register 204 may come from the BIOS via line 206. In some embodiments, the BIOS passes a rev ID to peripheral device 200 that is to be stored in register 204. The rev ID coming from the BIOS may represent the version of hardware that was implemented in the original system architecture.

In this manner, the peripheral device 200 may contain both the current hardware rev ID and the original hardware rev ID. Peripheral device 200 may include a selection circuit 208 (e.g., a mutiplexer) controlled by a latch circuit 209 and an external select line 210 coming from the BIOS. In some embodiments, the latch circuit 209 retains the value asserted on the select line 210 for use by the selection circuit 208. Using the asserted value, the selection circuit 208 may provide either the hard coded value from register 202 or the programmed value from register 204 to the operating system and other peripherals via line 212. In some embodiments, external select line 210 may be configured such that the rev ID reported to the operating system and other peripherals reflects the original hardware rev ID or any other rev ID which does not cause stability problems with the operating system or other hardware. Note that although not specifically shown, the incoming and outgoing lines (i.e., 206, 210, 212) of peripheral device 200 may couple to any device in system 100 using any of the buses outlined in FIG. 1.

Figure 3:
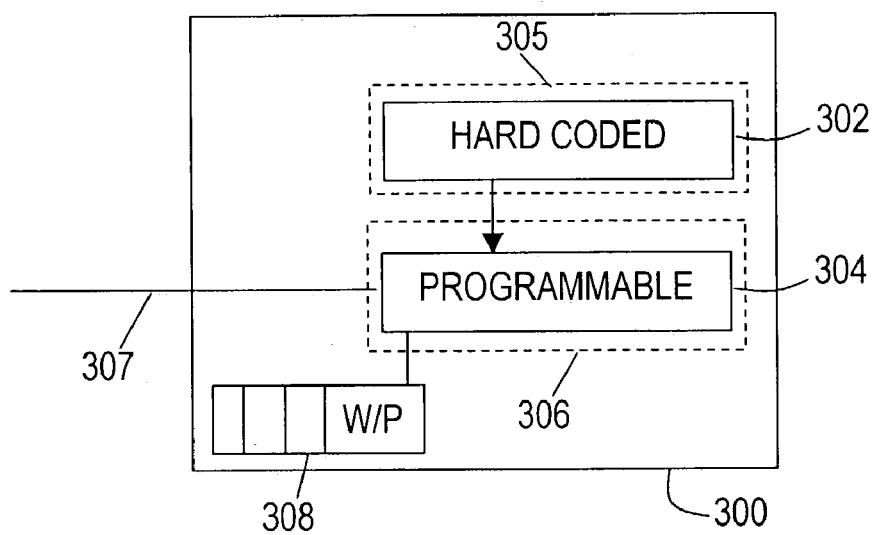
FIG. 3 shows another peripheral according to embodiments of the invention.

FIG. 3 shows another configuration of peripheral device 300 according to embodiments of the invention, including a hard coded register 302 and a programmable register 304. Register 302 may be contained in a peripheral memory 305 and register 304 may be contained in another peripheral memory 306. Note that memory 305 and 306 may or may not be associated with each other. In some embodiments, the value in register 302 is loaded into register 304 by default when the system powers up. In addition, register 304 may be written to by the BIOS using data line 307. A status register 308 is coupled to the programmable register 304 and may contain various status bits, such as a write-protect bit, which when disabled, write-enables or allows the programmable register 304 to be written to. For example, when the system determines that the rev ID value contained in system ROM 124 does not match the value stored in programmable register 304, register 304 may be programmed by the BIOS to reflect the value from the system ROM 124. After register 304 is written to, the write-protect bit may be enabled so that register 304 cannot be overwritten. The rev ID written by the BIOS may be the original hardware rev ID or any other rev ID which may not cause stability problems with the operating system or other hardware.

Also, in some embodiments, the system ROM 124 may not need to be "flashed" or electrically reprogrammed in order to synchronize rev IDs every time a hardware manufacturer releases hardware with a new rev ID. This may be desirable from a computer manufacturer's perspective because flashing a system ROM may be a cumbersome process, especially when multiple systems need to be flashed. Also, if a hardware rev ID change is in fact a result of new functionality requiring a new driver, the new rev ID may be made available to the operating system and other hardware devices.

Boot Process

Figure 4:
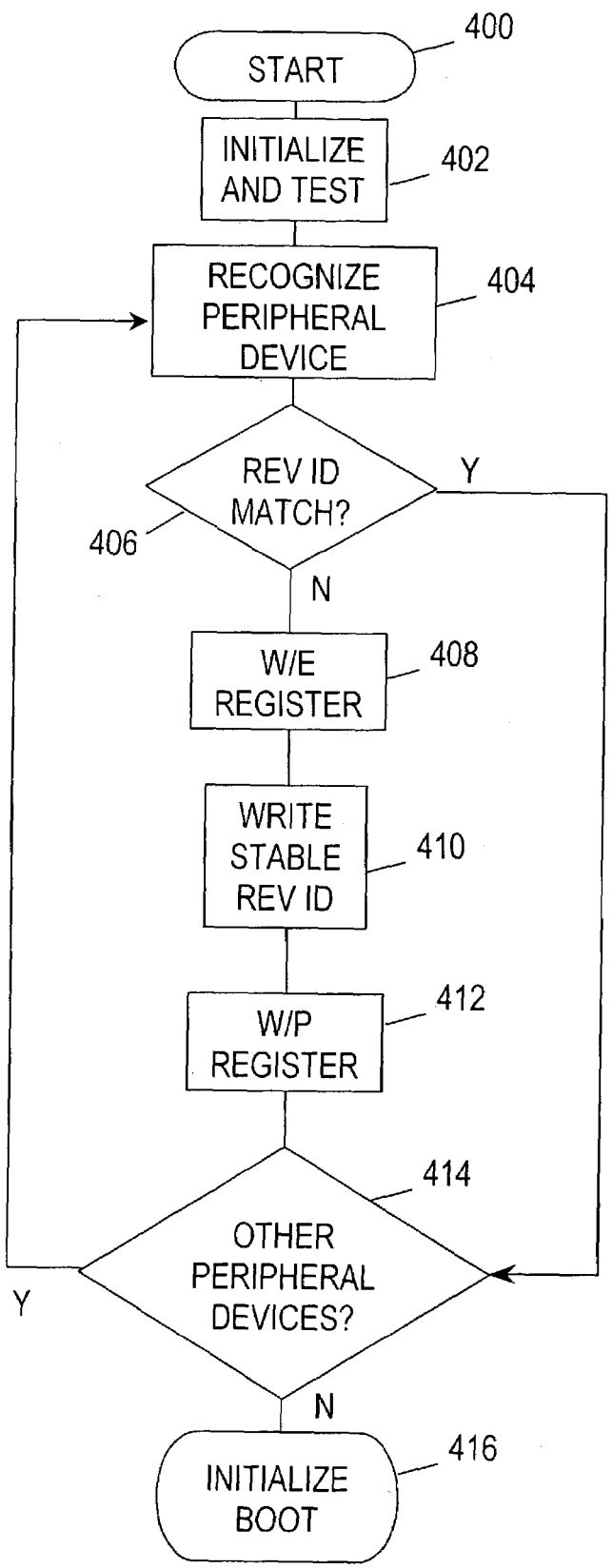
FIG. 4 shows an exemplary boot process according to embodiments of the invention.

In accordance with embodiments of the present invention, an exemplary boot process that may be used by the BIOS is shown in FIG. 4. At block 400 system 100 starts the boot process. The boot process contained in FIG. 4 may comprise part of the Power-On-Self-Test ("POST") of system 100. Generally the POST is performed to initialize the hardware for use by the operating system and to verify that it is functional.

After the start routine 400, the hardware is typically initialized and functionally tested in block 402. In block 404, a first peripheral hardware device is recognized and rev ID of each peripheral hardware device is read. Note that the peripheral hardware devices may be any type coupled to system 100—e.g., PCI devices. Block 406 determines whether the rev ID read in block 404 matches the value contained in system ROM 124. If the rev ID read from the peripheral hardware device 300 does not match the desired value contained in system ROM 124, then this could indicate that the peripheral device 300 is a new device that can cause instability. Thus, in block 408, the write-protect bit of register 308 may be disabled so that the programmable register is write-enabled. In block 410, a desired rev ID may be written to register 304. The value written in block 410 is preferably a value that promotes overall system stability and therefore may represent the original value as contained in the system ROM 124. After the desired value is written to register 304 it may be write-protected in block 412, so that the value contained in it may not be overwritten. In block 414, the process determines if there are any additional peripheral devices present. If there are more peripheral devices, blocks 404 through 414 are completed for each peripheral device so that each receives the desired rev ID. Once each peripheral devices has been initialized to a desired rev ID, system boot may occur in block 416 and the operating system may take control of system 100.

In addition, if block 406 reveals that the rev ID read in block 404 matches the value contained in system ROM 124, then the process may jump to block 414 to determine if there are any more peripheral devices that do not match the system ROM 124.

Figure 5:
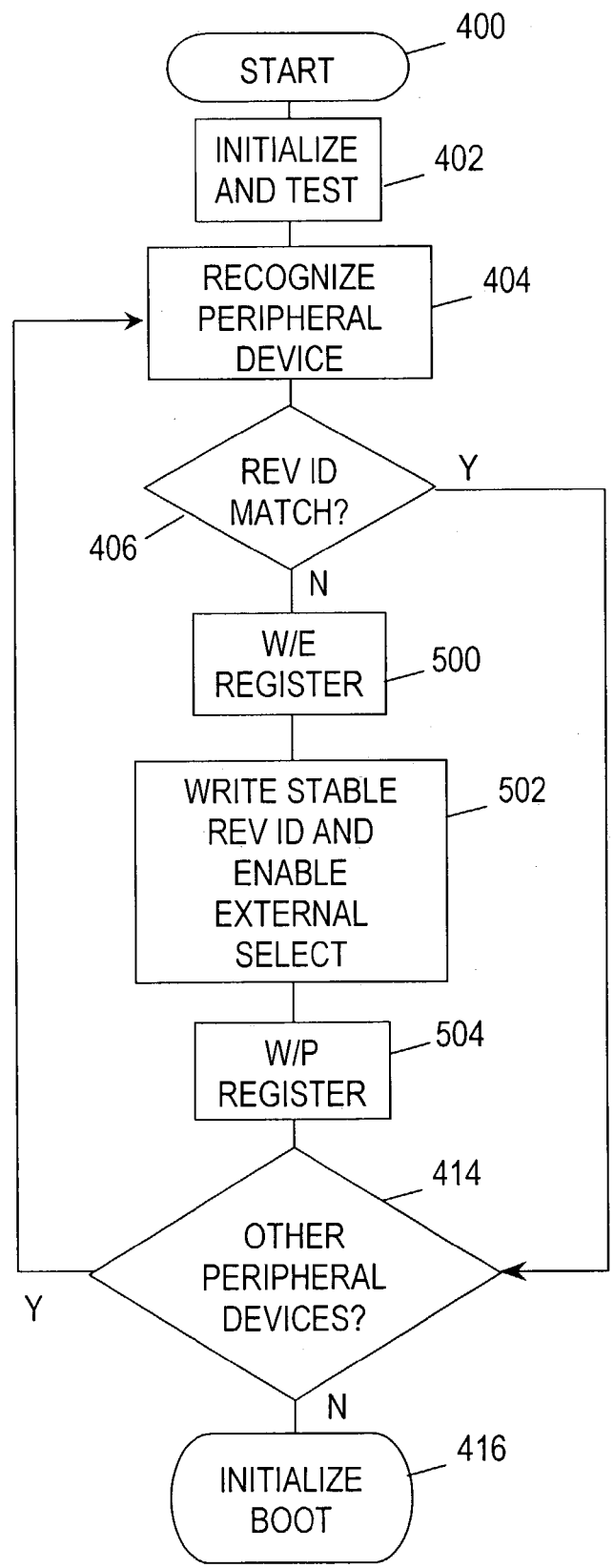
FIG. 5 shows an alternate boot process according to embodiments of the invention.

Another exemplary boot process according to embodiments of the invention that may be used by the BIOS is shown in FIG. 5. Note that the boot process of FIG. 5 contains similar blocks 400, 402, 404, 406, 414, and 416 with similar functions as contained in FIG. 4. Again, block 400 begins the system boot process, after which, the hardware is initialized and functionally tested in block 402. Block 404 recognizes a first peripheral hardware device, and the hard coded register 202 of peripheral memory 203 is read. Block 406 determines whether the rev ID read from register 202 matches the value contained in system ROM 124. If the rev ID in register 202 does not match the desired value contained in system ROM 124, then programmable register 204 may be write-enabled in block 500. In block 502, a desired rev ID may be written to register 204, and external select line 210 is set such that peripheral hardware device 200 reports the rev ID value from register 204. In block 504, register 204 may then be write-protected so that the value contained in it may not be overwritten. Again, the value written in block 502 may typically be a value that promotes over all system stability and therefore may represent the original value as contained in the system ROM 124. In block 414, the process determines if there are any additional peripheral devices present and may loop through the previous blocks for each peripheral device present. Once each peripheral device has been initialized to a desired rev ID, if required or advantageous system boot occurs in block 416 and the operating system may take control of system 100.

As was the case before, if block 406 reveals that the rev ID read in block 404 matches the value contained in system ROM 124, then the process may jump to block 414 to determine if there are any more peripheral devices that do not match the system ROM 124.

Numerous variations and modifications will become apparent to those skilled in the art once the above disclosure is fully appreciated. For example, the ordering of the blocks described above may be rearranged and still yield the same desired effect. Also, the involvement of the BIOS in some of the embodiments is optional, and the computer system disclosed may comply with the peripheral component interconnect ("PCI") specification in that the rev ID value in the peripheral hardware devices may be write-protected. It is intended that the following claims be interpreted to embrace all such variations and modifications.

What is claimed is:

1. A computer system, comprising:
    a memory;
    a plurality of hardware devices coupled to the memory;
    wherein the memory contains revision identification numbers ("rev IDs") for the plurality of hardware devices;
    wherein at least one hardware device includes a hard coded register hardwired to a predetermined rev ID and a programmable register that may be programmed to a rev ID number; and
    wherein the programmable register is programmed if the rev ID in the hard coded register does not match a corresponding value in the memory.

2. The computer system of claim 1, wherein the programmed rev ID contained in the programmable register comes from the memory and reflects a rev ID from an earlier version of the hardware device.

3. The computer system of claim 1, wherein the hardware device further comprises a selector that provides either the hard coded register contents or the programmable register contents to the computer system.

4. The computer system of claim 3, further comprising a basic input/output system ("BIOS") wherein the selector is controlled in part, by the BIOS and the programmed value in the programmable register is read from the memory.

5. The computer system of claim 4, wherein the selector outputs the contents of the programmable register to the operating system if the rev ID contained in the hard coded register does not match an original rev ID stored in the memory.

6. A computer system, comprising:
    a memory;
    a hardware device coupled to the memory comprising a hard coded register that is hardwired to a predetermined rev ID, a programmable register, and a status register that controls the operation of the programmable register;
    wherein the rev ID stored in the hard coded register of the hardware device does not match an expected value stored in the memory; and
    wherein the programmable register is programmed to the expected value stored in the memory.

7. The computer system of claim 6, further comprising an operating system, wherein the contents of the programmable register are available to the operating system.

8. A method, comprising:
    (a) recognizing a hardware device within a computer system, wherein the device comprises a hard coded register and a programmable register;
    (b) comparing a rev ID number in a register of the hardware device to a value stored in a memory that is coupled to the hardware device;
    (c) writing a desired value to the programmable register if (b) does not indicate a match; and
    (d) repeating (a) through (c) for at least one hardware device.

9. The method according to claim 8, wherein the computer system further comprises an operating system that reads a rev ID number of at least one device that has undergone (a) through (d).

10. The method according to claim 8, wherein the operating system reads an expected rev ID.

11. The method according to claim 8, wherein if the comparison in (b) determines that the rev ID matches, then skipping to (d).

12. The method according to claim 8, wherein the desired value of (d) comprises a rev ID coming from the system ROM.

13. A method, comprising:
    (a) recognizing a hardware device within a computer system that comprises a programmable register and a hard coded register;
    (b) comparing a rev ID number in the hard coded register to a value stored in a memory coupled to the computer system;
    (c) writing a desired rev ID to the programmable register if (b) does not indicate a match;
    (d) enabling an external select line of the hardware device to provide the rev ID value from the programmable register to the computer system; and
    (e) determining if there are other hardware devices present, and repeating (b) through (d) for at least one device.

14. The method according to claim 13, wherein the computer system includes an operating system that reads a rev ID number of a hardware device after the devices have undergone (a) through (e).

15. The method according to claim 14, wherein the operating system reads a rev ID which does not indicate a change in hardware version.

16. The method according to claim 13, wherein if the comparison in (b) determines that the rev ID matches, then skipping to (e).

17. The method according to claim 15, wherein the rev ID written in (c) comes from the memory.

18. The method according to claim 15, wherein the external select line selects the programmable register if the comparison of (b) does not indicate a match.

19. The method according to claim 15, wherein the hardware device is capable of making the contents of the programmable register or the hard coded register available to the computer system.

20. A hardware device, comprising:
a hard coded register;
a memory coupled to the hard coded register;
wherein the hard coded register is hardwired to a predetermined revision identification number ("rev ID");
wherein the memory includes a programmable register that may be programmed to a rev ID number;
wherein the programmed rev ID number is received from a source that is external to the hardware device;
wherein the hard coded rev ID and the programmed rev ID do not match; and
wherein the programmed rev ID contained in the programmable register comes from a memory external to the hardware device and reflects a rev ID from an earlier version of the hardware device.

21. The hardware device of claim 20, wherein the hardware device further comprises a selector that provides either the hard coded register contents or the programmable register contents to a computer system.

22. The hardware device of claim 21, wherein the rev ID contained in the hard coded register does not match an original rev ID stored in the computer system and the selector outputs the contents of the programmable register to the operating system.

\* \* \* \* \*